(12) United States Patent
Ogino et al.

(10) Patent No.: US 6,865,394 B2
(45) Date of Patent: Mar. 8, 2005

(54) LOCATION DETECTION METHOD, LOCATION DETECTION SYSTEM AND LOCATION DETECTION PROGRAM

(75) Inventors: Atsushi Ogino, Kodaira (JP); Mikio Kuwahara, Hachioji (JP); Tomoaki Ishifuji, Tokyo (JP)

(73) Assignee: Hitachi, LTD, Tokyo (JP)

( * ) Notice: Subject to any disclaimer, the term of this patent is extended or adjusted under 35 U.S.C. 154(b) by 569 days.

(21) Appl. No.: 10/050,856

(22) Filed: Jan. 18, 2002

(65) Prior Publication Data

US 2002/0132625 A1 Sep. 19, 2002

(30) Foreign Application Priority Data

Jan. 31, 2001 (JP) ........................................ 2001-023650

(51) Int. Cl.[7] ................................................ H04Q 7/20
(52) U.S. Cl. ................................ 455/456.1; 455/456.4; 455/456.5; 455/456.6; 342/357.01; 342/357.03; 342/357.1; 342/172; 701/207; 701/213; 701/214; 340/988; 340/993
(58) Field of Search ............................ 455/456.1–456.6; 342/450, 452, 457, 458, 463–465, 357.01, 357.08, 357.1, 357.02, 357.13; 701/207, 213, 214

(56) References Cited

U.S. PATENT DOCUMENTS

| | | | |
|---|---|---|---|
| 3,659,085 A | * 4/1972 | Potter et al. ................. | 701/207 |
| 5,657,232 A | * 8/1997 | Ishikawa et al. ............ | 701/215 |
| 5,717,406 A | * 2/1998 | Sanderford et al. ......... | 342/457 |
| 5,825,328 A | * 10/1998 | Schipper et al. ....... | 342/357.03 |
| 5,917,449 A | 6/1999 | Sanderford et al. | |
| 6,097,959 A | * 8/2000 | Yost et al. ............... | 455/456.2 |
| 6,313,786 B1 | * 11/2001 | Sheynblat et al. ..... | 342/357.02 |
| 6,420,999 B1 | * 7/2002 | Vayanos ................. | 342/357.03 |
| 6,636,744 B1 | * 10/2003 | Da .......................... | 455/456.1 |
| 2001/0008393 A1 | * 7/2001 | Valio et al. ............ | 342/357.02 |

FOREIGN PATENT DOCUMENTS

| EP | 1 111 403 A2 | 7/2000 |
|---|---|---|
| JP | 7-181242 | 12/1993 |
| JP | 2000-75012 | 9/1998 |

OTHER PUBLICATIONS

U.S. Appl. No. 09/940,548 filed Aug. 29, 2001, Tsunehara et al.
U.S. Appl. No. 10/038,677, filed Jan. 8, 2002, Watanabe et al.

* cited by examiner

*Primary Examiner*—Edward F. Urban
*Assistant Examiner*—Huy Phan
(74) *Attorney, Agent, or Firm*—Reed Smith LLP; Stanley P. Fisher, Esq.; Juan Carlos A. Marquez, Esq.

(57) ABSTRACT

A positioning method, which is related to a technique to measure a correct position of a terminal by preventing time required for the position measurement, of calculating a position of a receiver according to signals from a plurality of wireless transmitters includes a first step of measuring propagation delay time of the signal from each of the wireless transmitters and calculating a position of the receiver and a standard deviation about measuring distance error, a second step of calculating a positioning error of the receiver a third step of determining, according to the positioning error calculated by the second step, wireless transmitters in directions nearer to a direction in which the positioning error is large, and a fourth step of re-detecting signals from the wireless transmitters determined by the third step and thereby re-calculating the position of the receiver.

13 Claims, 12 Drawing Sheets

LOCATION DETECTION METHOD, LOCATION DETECTION SYSTEM AND LOCATION DETECTION PROGRAM

BACKGROUND OF THE INVENTION

The present invention relates to a method of measuring a location of a receiver according to propagation delay time of a signal transmitted from a wireless transmitter, and in particular, to a method of measuring a location of a receiver with high precision according to propagation delay time of a signal sent from a mobile base station.

There has been proposed a technique to detect in a mobile communication system a location of a terminal device or a terminal according to a signal sent from a base station. For example, JP-A-7-181242 (laid-open on Jul. 21, 1995) proposes a technique in which in a Code Division Multiple Access (CDMA) system, a location of a terminal is measured by obtaining time differences between transmission times of a pseudo-noise (PN) code from respective base stations by use of locations of the base stations and propagation times of signals sent from the base stations to the terminal.

SUMMARY OF THE INVENTION

Errors in the location measurement of a terminal according to signals sent from base stations can be improved, for example, by obtaining an average or a mean value of determined values of transmission delay time of the signals from the respective base stations or by elongating the integration time to detect signals to determine the propagation delay time. However, the increase in the number of samples for the averaging operation and the elongation of the integration time for the signal detection reduces measurement or positioning errors, but increases a period of time to obtain results of measurement. This increases power consumption of the terminal. Therefore, it is desired in the positioning of the terminal that after the positioning errors are calculated, the position of the terminal is efficiently determined according to a state of errors in the measurement.

It is therefore an object of the present invention that a correct position of the terminal is measured by reducing positioning errors of the terminal position while preventing increase in the time and the power consumption required for the positioning operation.

According to one aspect of the present invention, there is provided a positioning method of calculating a position of a receiver according to propagation delay time of signals from a plurality of wireless transmitters, comprising a first step of detecting a signal from each of the wireless transmitters, obtaining a position of each of the wireless transmitters from which the signal is detected, measuring propagation delay time of the signal from each of the wireless transmitters, and calculating a position of the receiver and a standard deviation about measuring distance error associated with the measurement of the propagation delay time; a second step of calculating a positioning error of the receiver according to the position of each of the wireless transmitters and the position of the receiver and the standard deviation calculated in said first step; a third step of determining, according to the positioning error of the receiver calculated in said second step, wireless transmitters in directions nearer to a direction in which the positioning error is large; and a fourth step of re-detecting signals from the wireless transmitters in directions nearer to a direction in which the positioning error is large determined in said third step and thereby re-calculating the position of the receiver.

According to the present invention, there is provided a positioning system for calculating a position of a receiver according to propagation delay time of signals from a plurality of wireless transmitters, comprising a receiver unit for receiving a signal from each of said wireless transmitters; a delay profile generator for generating a delay profile of a signal from said each wireless transmitter and for outputting the delay profile; a propagation time measurement unit for analyzing the delay profile and for thereby measuring propagation delay time of the signal; a storage unit for storing data required to calculate a position of the positioning system; and a processing unit for controlling said receiver unit, said delay profile generator, said propagation time measurement unit, and said storage unit for processing various data used to calculate the position and for thereby conducting a positioning operation, wherein said processing unit comprises positioning means for obtaining a position of said positioning system according to the propagation delay time measured by said propagation time measurement unit; standard deviation calculating means for calculating a standard deviation about measuring distance error associated with the measurement of the propagation delay time; and error calculating means for calculating a positioning error of said positioning system according to the position of each of said wireless transmitters, the position of said positioning system calculated by said position calculating means, and the standard deviation calculated by said standard deviation calculating means.

According to the present invention, the correct location of the terminal can be measured by preventing the increase in the time and the consumption power required for the positioning. Moreover, a location information supplying device and a location information supplying system according to the present invention is useful to recognize positioning errors to determine continuation or termination of the positioning operation.

BRIEF DESCRIPTION OF THE DRAWINGS

The objects and features of the present invention will become more apparent from the consideration of the following detailed description taken in conjunction with the accompanying drawings in which.

DETAILED DESCRIPTION OF THE EMBODIMENTS

Figure 1:
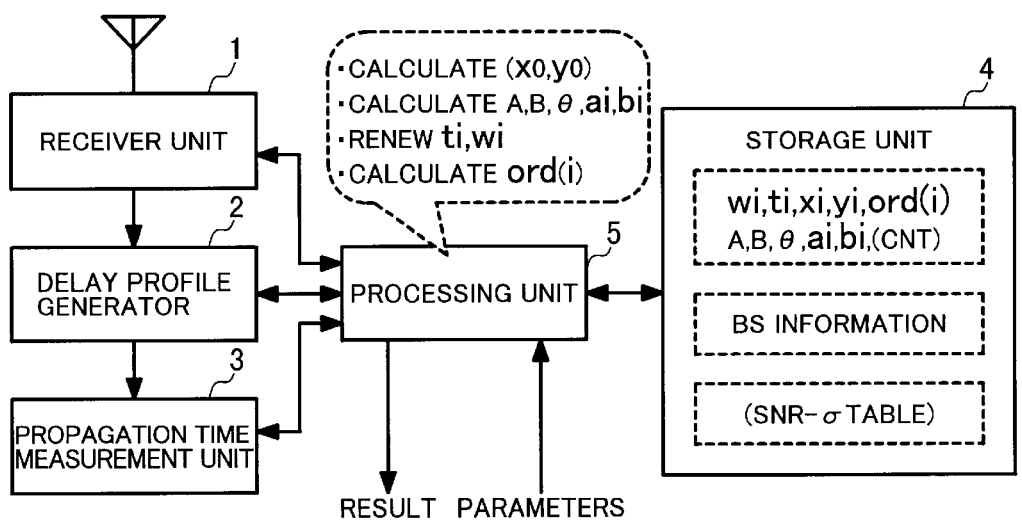
FIG. 1 is a block diagram showing a first embodiment of a positioning unit according to the present invention.

Referring now to the drawings, description will be given of an embodiment of the present invention.

FIG. 1 shows in a block diagram a primary configuration of a positioning unit in a first embodiment of the present invention.

In this system, a receiver unit 1 receives a signal from a base station, not shown, under control of a processing unit 5, conducts a baseband filtering operation for the signal, and outputs a signal resultant from the filtering operation to a delay profile generator 2. The receiver unit 1 also measures power of noise and outputs an obtained noise power to the processing unit 5.

According to the signal from the receiver unit 1, the delay profile generator 2 generates a delay profile for a base station indicated by the processing unit 5 and outputs the delay profile to a signal delay time measurement unit 3 and the processing unit 5.

The signal delay time measurement unit 3 analyzes the delay profile from the delay profile generator 2 under control of the processing unit 5 to determine propagation delay time of the signal from the base station and outputs the propagation delay time to the processing unit 5.

A storage unit 4 stores or accumulates base station information and an SNR-σ table. The processing unit 5 reads these information from the storage unit 4. The base station information corresponds to an identifier number of each base station and includes information items such as a location or position of the base station, a frequency (channel) and transmission timing (a PN code) thereof necessary to receive a signal therefrom. The SNR-σ table is a table of a correspondence between SNR and σ to obtain a standard deviation about measuring distance error (σ) using a signal-to-noise ratio (SNR) of a signal used for the measurement. In the positioning method shown in FIG. 4, positioning errors are calculated assuming that the SNR-σ table is a fixed value.

The storage unit 4 temporarily stores a location (xi, yi) of each detected base station, a determined value (ti) of propagation time on each base station, an inverse number (wi) of estimator (σ) of standard deviation about measuring distance error associated with the determination, a descending order (ord(i)) of base station that will improve positioning error, an estimated positioning error (A, B, θ), a partial result (ai, bi) for estimating positioning error, and a counter (CNT) indicating a number of required detection. The processing unit 5 reads these information from the storage unit 4.

The processing unit 5 controls the receiver unit 1, the delay profile generator 2, the propagation time measurement unit 3, and the storage unit 4 to conduct a positioning operation using various parameters. The processing unit 5 includes a processor and a memory. A program to execute procedures, which will be described later, so as to make units, which will be described later, conduct respective functions is stored to be kept in the memory. The processor reads the program from the memory and executes the program.

Figure 2:
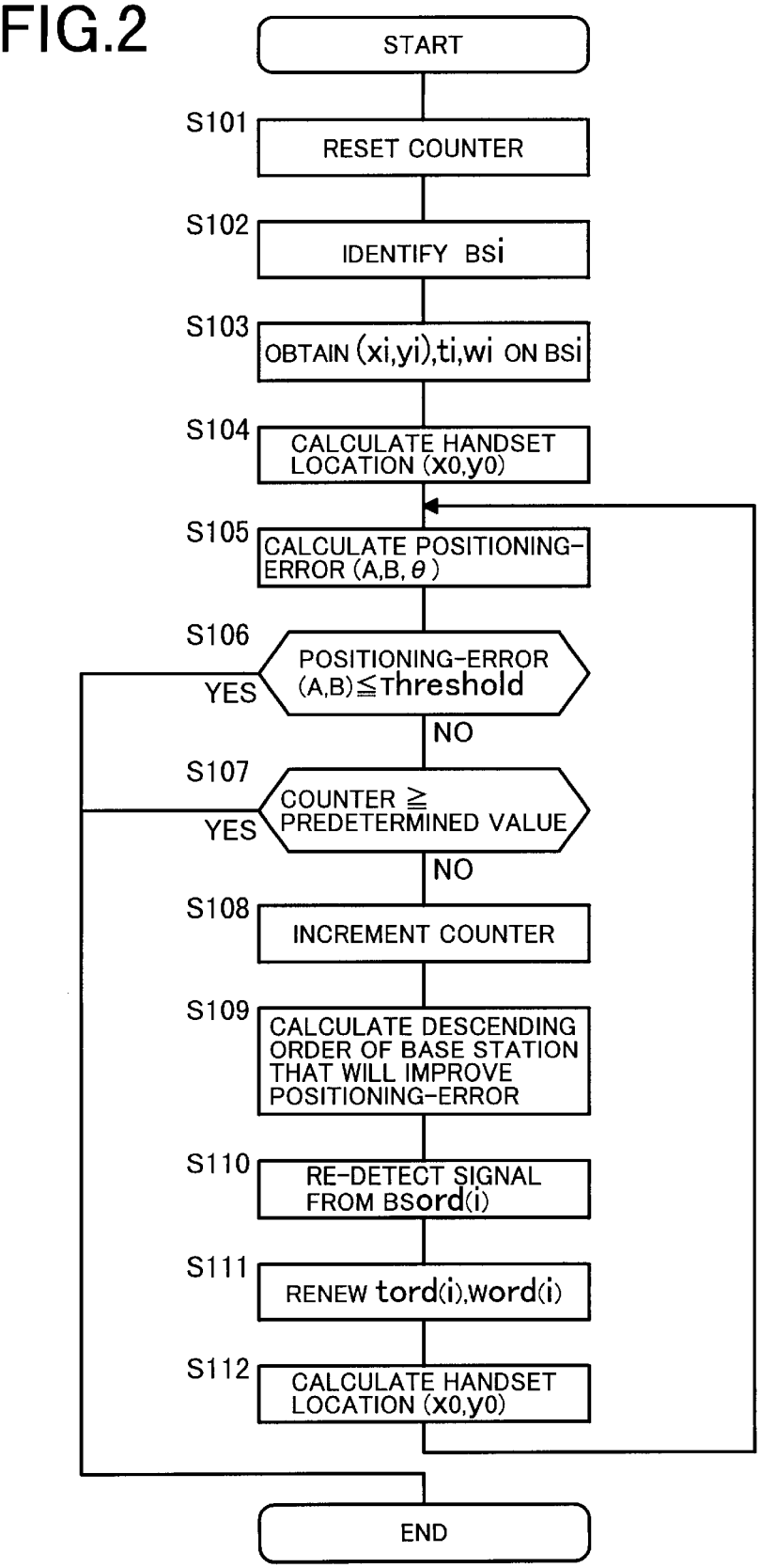
FIG. 2 is a flowchart showing a positioning method in the first embodiment according to the present invention.

FIG. 2 shows in a flowchart a positioning method in the first embodiment of the present invention.

First, the program resets a counter indicating the number of executions of a positioning operation by the positioning unit (S101). The counter is disposed to prevent occurrence of an event in which the positioning operation (S105 to S112) enters an infinite loop. The counter is beforehand initialized to "0" (S101). Each time the positioning operation is executed, a value is added to the counter (S108) to determine whether or not the number of executions of the positioning operation has reached a predetermined value (S107) to terminate the operation if necessary.

Next, in steps S102 to S104, the position of the positioning unit is roughly obtained. First, the positioning unit receives (detects) a signal from each base station to identify the base station as a signal transmitter (S102).

The program determines the propagation time (ti) of the signal from the base station and reads a position (xi, yi) of the base station BSi from the storage unit 4 according to an identifier number of the identified base station to calculate the standard deviation (σ) about measuring distance error on BSi resultant from the propagation time determination (S103). The standard deviation (σ) is calculated according to, for example, a signal-to-noise ratio (SNR) of a signal to be determined. Specifically, a table (SNR-σ table) of correspondence beforehand experimentally obtained between SNR and σ for a propagation time determining unit is stored in the storage unit 4 for the calculation of the standard deviation (σ). Alternatively, an expression of a relationship between SNR and σ may be stored in the storage unit 4. Or, depending on the determining unit, σ rarely changes even if SNR changes. Therefore, the measurement error may be calculated assuming that σ is a fixed value (reference is to be made to FIG. 4). Thereafter, an inverse number wi of the standard deviation is calculated to be stored in the storage unit 4.

Assume that n base stations detected in step S102 are BS1, BS2, . . . , BSn and the locations of the respective base stations are (x1,y1), (x2, y2), . . . , (xn, yn). Assume that the inverse numbers of estimators of standard deviation about measuring distance errors on the respective base stations are w1, w2, . . . , wn and the propagation delay time of the signals from the respective base stations are t1, t2, . . . , tn.

Subsequently, according to the location (xi, yi) of each detected base station and the propagation delay time (ti) of the signal from each base station, the location (x0, y0) of the positioning unit is calculated (S104). The location of the positioning unit can be calculated using the method described, for example, in JP-A-7-181242.

In step S105, the positioning error (A, B, θ) is calculated. To obtain the estimated value of positioning error, it is assumed that an x axis extends along a line drawn between the east and the west and has a positive direction toward the east, a y axis extending along a line drawn between the north and south and has a positive direction toward the north, an x' axis is generated by rotating the x axis counterclockwise by an angle of θ, and a y' axis is orthogonal to the x' axis. Assume that a component in the direction of the x' axis of the estimated value of positioning error is A and a component in the direction of the y' axis thereof is B. The estimated value of positioning error is expressed using A, B, and θ defined as above. These parameters are obtained using expressions (1), (2), and (3) as below.

$$A = \left\{ \sum_{i=1}^{i=n} w_i^2 \sum_{j=1}^{j=n} b_j^2 - \left( \sum_{i=1}^{i=n} w_i b_i \right)^2 \right\} / D \quad (1)$$

$$B = \left\{ \sum_{i=1}^{i=n} w_i^2 \sum_{j=1}^{j=n} a_j^2 - \left( \sum_{i=1}^{i=n} w_i a_i \right)^2 \right\} / D \quad (2)$$

$$\theta = -\phi \quad (3)$$

Parameter D of expressions (1) and (2) is as follows.

$$D = \sum_{i=1}^{i=n} w_i^2 \sum_{j=1}^{j=n} a_j^2 \sum_{k=1}^{k=n} b_k^2 + 2 \sum_{i=1}^{i=n} w_i a_i \sum_{j=1}^{j=n} a_j b_j \sum_{k=1}^{k=n} w_k b_k - \sum_{i=1}^{i=n} w_i^2 \left( \sum_{j=1}^{j=n} a_j b_j \right)^2 - \left( \sum_{i=1}^{i=n} w_i a_i \right)^2 \sum_{j=1}^{j=n} b_j^2 - \sum_{i=1}^{i=n} a_i^2 \left( \sum_{j=1}^{j=n} w_j b_j \right)^2 \quad (4)$$

Parameters $a_i$ and $b_i$ of expression (4) are obtained as below.

$$\begin{pmatrix} a_i \\ b_i \end{pmatrix} = \begin{pmatrix} \cos\varphi & -\sin\varphi \\ \sin\varphi & \cos\varphi \end{pmatrix} \begin{pmatrix} u_i \\ v_i \end{pmatrix} \quad (5)$$

Parameters $u_i$ and $v_i$ of expression (5) are as follows.

$$u_i = w_i(x_i - x_0)/\sqrt{(x_i-x_0)^2 + (y_i-y_0)^2} \quad (6)$$

$$v_i = w_i(y_i - y_0)/\sqrt{(x_i-x_0)^2 + (y_i-y_0)^2} \quad (7)$$

Parameter φ of expression (3) is as below.

$$\phi = \arctan \alpha \quad (8)$$

Parameter α of expression (8) is obtained using the following expression.

$$\left\{ \sum_{i=1}^{n} w_i^2 \sum_{j=1}^{n} u_j v_j - \sum_{i=1}^{n} w_i u_i \sum_{j=1}^{n} w_j v_j \right\} \alpha^2 + \left\{ \left( \sum_{i=1}^{n} w_i u_i \right)^2 - \left( \sum_{i=1}^{n} w_i v_i \right)^2 - \sum_{i=1}^{n} w_i^2 \sum_{j=1}^{n} (u_j^2 - v_j^2) \right\} \alpha + \left\{ \sum_{i=1}^{n} w_i u_i \sum_{j=1}^{n} w_i v_i - \sum_{i=1}^{n} w_i^2 \sum_{j=1}^{n} u_j v_j \right\} = 0 \quad (9)$$

As a result of the computation, the x' and y' axes are determined to maximize the positioning error. Under this condition, the positioning error takes its maximum value at angle θ.

Expression (10), namely, $$(x_0, y_0) \quad (10)$$

indicates a pair of coordinates of the location of the positioning unit. The location is calculated in step S104. Moreover, expression (11), namely, $$(x_i, y_i), i=1,2,\ldots n \quad (11)$$

indicates a pair of coordinates of the location of the base station BSi detected by the positioning unit. The location is read from the storage unit 4 in step S103. Furthermore, expression (12), namely, $$w_i, i=1,2,\ldots n \quad (12)$$

indicates an inverse number of estimator of standard deviation associated with determination of propagation delay time of a signal from each base station BSi. This value is calculated using the SNR-σ table in step S103. The number n of detected base stations is the number of base stations from which signals are received in step S102.

In step S106, a check is made to determine whether or not the positioning operation is to be terminated. If the estimated positioning errors A and B are both equal to or less than a predetermined threshold value ("yes" in S106), the positioning operation is terminated, and a pair of current values (x0, y0) at this point of time is outputted as the location of the positioning unit.

On the other hand, if either one of the values A and B exceeds the predetermined value ("no" in S106), the counter value indicating the number of positioning operations is checked (S107) and then control goes to step S108. Incidentally, it is also possible in step 106 that a value of $A^2+B^2$ or a square thereof is compared with a threshold value without comparing each of the values A and B with a threshold value.

A check is made to determine whether or not the counter value of the counter indicating the number of positioning operations has reached a predetermined value (S107). The counter is disposed to prevent occurrence of an event in which neither of the positioning errors is decreased below the threshold value even after the positioning operation from step S105 to step S112 and the processing enters an infinite loop. In step S108, "1" is added to the counter indicating the number of positioning operations each time the positioning operation is executed.

For the positioning error calculated in step 105, the descending order {ord(i)} of the base station that will improve positioning error is obtained (S109). Operation of step S109 will be described in detail later by referring to FIG. 3.

Thereafter, a signal is re-detected from each base station BSORD(I) associated with the order obtained in step S109 (S110). Using the re-detected signal, propagation delay time tORD(I) is again determined for the signal from each base station and the standard deviation about measuring distance error is re-calculated for the base station from which the signal is re-detected, and resultantly renews or updates inverse number wORD(I) of the standard deviation (S111).

Assume that the base station from which the signal is re-detected in the step above is BSi. Assume that the propagation delay time of the signal measured and obtained before the previous step is ti, and the inverse number of the standard deviation about measuring distance error of the signal associated with determination of propagation delay time is wi, the propagation delay time of the signal measured in the re-detection is ti', and the inverse number of the standard deviation about measuring distance error of the re-detected signal associated with determination of propagation delay time is wi'.

Under this condition, the propagation delay time ti of the base station is obtained and is renewed as below.

$$t_i = \frac{w_i^2}{w_i^2 + w_i'^2} t_i + \frac{w_i'^2}{w_i^2 + w_i'^2} t_i' \qquad (13)$$

The inverse number wi of the standard deviation about measuring distance error associated with re-detection of the base station is renewed as follows.

$$w_1 = \sqrt{w_i^2 + w_i'^2} \qquad (14)$$

The values ti and wi are renewed in this order, namely, ti by expression (13) and wi by expression (14).

According to the pair of coordinate values (xi, yi) of each base station and the propagation time ti of the signal from the base station, the location (x0, y0) of the positioning unit is calculated (S112). Control then returns to step S105, and the positioning errors are again calculated (S105) to determine whether or not the positioning errors are equal to or more than the threshold value (S106).

In steps S110 to S112, by averaging the determined values of the propagation times thus measured many times, the positioning errors can be lowered for the base stations to be re-detected. In general, when each measurement or positioning is an independent event, the error in one measurement can be lowered. Specifically, the resultant error is expressed by a value obtained by multiplying the original error by an inverse number of a square of the number of repetitions of measurement (M).

The positioning errors can also be reduced for the base station of the redetection by improving the signal-to-noise ration (SNR) of the received signal. A concrete example is the increase in the number of coherent accumulations. In general, by an m-time coherent accumulation, the value of SNR can be improved to a value obtained by multiplying the original value by m.

In step S103 or S111, the reference time to determine the propagation time ti and tORD(I) is not necessarily an absolutely exact time, namely, it is only necessary that the time is a relatively correct time. However, in steps S103 and S111, the same reference time must be used. For example, when a pilot signal sent from one of the base stations identified in step 103 is used as a reference time, the base station used as the reference must be also re-detected and the pilot signals sent from the base station must be used as a reference signal in step S111.

To determine the base stations that will improve positioning error, a method which will be described in conjunction with FIG. 3 can be used. That is, several base stations are selected from the base stations in direction nearer to the direction with the largest positioning errors or from the base stations which have higher values of the order and which are in directions nearer to the direction with the largest positioning errors.

Figure 3:
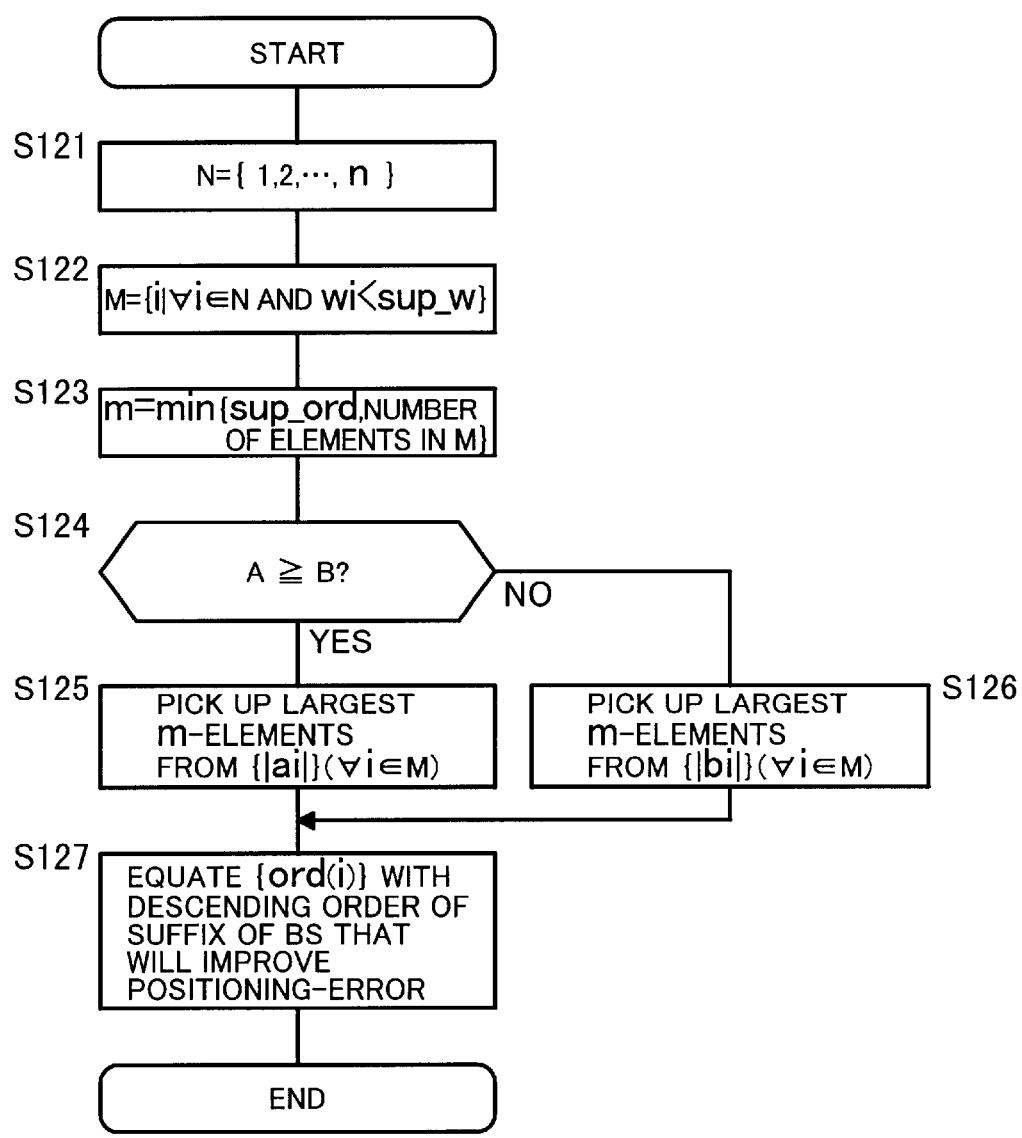
FIG. 3 is a flowchart showing a method of obtaining a base station that will improve positioning error in the first embodiment according to the present invention.

FIG. 3 shows in a flowchart a method of obtaining base stations that will improve positioning error in the positioning method shown in FIG. 2.

First, assume that a set including suffixes of n base stations BS1, BS2, . . . , BSn last detected is expressed as N={1, 2, . . . n} in step S121. Assume that a set of elements i of N which satisfy wi<sup_w for a predetermined value sup_w is expressed as M (S122). In this case, wi is an inverse number of estimator of standard deviation about measuring distance error on each base station and sup_w is a threshold value for the inverse number of estimator of standard deviation. The set M generated in step S122 is a set of suffixes of bases stations selected from the detected base stations, the selected base stations having the standard deviation more than a predetermined threshold value (that is, the inverse number of the standard deviation less than a predetermined threshold value). In this connection, if the threshold value is not required for the calculated standard deviation, it is possible that M is equal to N.

Thereafter, the number of elements of M is compared with the maximum number of base stations predetermined for redetection (sup_ord) to determine a smaller one thereof. Assume that the smaller value is represented by m (S123).

The estimated error A in the x'-axis direction is then compared with the estimated error B in the y'-axis direction. If $A \leq B$ ("yes" in S124), m elements are extracted from a set {ai} of errors in the x'-axis direction for elements i of set M in a descending order of absolute values of elements ai (S125). These elements are expressed as aORD(1), aORD(2), . . . , aORD(M). On the other hand, if A<B ("no" in S124), m elements are extracted from a set {bi} of errors in the y'-axis direction for elements i of set M in a descending order of absolute values of elements bi (S126). These elements are expressed as bORD(1), bORD(2), . . . , bORD(M). Since ORD(1), ORD(2), . . . ORD(M) indicate order of base stations that will improve positioning error, the base station BSORD(1) is larger in the error improvement than the base station BSORD(2). Incidentally, the m largest elements may be selected from each of the sets {ai} and {bi} as follows. If an absolute value |a(ORD(J)/aORD(1)| of a value obtained by dividing an error aORD(J) in the x'-axis direction for element j (j<m) by an error aORD(1) in the x'-axis direction for element 1 and an absolute value |b(ORD(J)/bORD(1)| of a value obtained by dividing an error bORD(J) in the y'-axis direction for element j by an error bORD(1) in the y'-axis direction for element 1 are both equal to or less than a predetermined value sup_r, it is assumed that the error improvement by the j-th and subsequent base stations is small. The number m of the base stations that will improve positioning error is then renewed as m=j−1 to stop the ordering operation. In this situation, according to the value of m, the number of base stations to be re-measured in the positioning method shown in FIG. 2 becomes j−1.

Next, description will be given of operation in which the positioning method is executed in the positioning unit (FIG. 1) described above.

The processing unit 5 reads base station information from the storage unit 4 to control the receiver unit 1 to receive signals from the base stations. According to timing information in the base station information obtained from the storage unit 4, the processing unit 5 controls the delay profile generator 2 to generate a delay profile of each base station. According to signal power of the delay profile of each base station generated by the delay profile generator 2, the processing unit 5 determines a base station from which a signal is received to identify the base station BSi (S102).

For the base station BSi from which a signal is detected, the processing unit 5 controls, according to information of the delay profile, a reference time, and transmission timing of the base station, the propagation time measurement unit 3 to determine a signal propagation delay time. Additionally, the processing unit 5 temporarily stores the position (xi, yi) of the base station in the storage unit 4. Also, the processing unit 5 temporarily stores the determined value of propagation time ti measured by the propagation time measurement unit 3 in the storage unit 4. According to the power of noise from the receiver unit 1 and the power of a signal from the delay profile generator 2, the processing unit 5 obtains the standard deviation about measuring distance error σ using the SNR-σ table stored in the storage unit 4, obtains an inverse number wi of the standard deviation σ, and temporarily stores the inverse number wi in the storage unit 4 (S103).

Subsequently, the processing unit 5 calculates the position (x0, y0) of the positioning unit according to the positions {(xi, yi)} and the determined values {ti} of signal propagation times of all detected base stations and then temporarily stores the (x0, y0) in the storage unit 4 (S104).

According to the position (x0, y0) of the positioning unit, the positions {(xi, yi)} of the base stations, and the inverse numbers {wi} of the standard deviation about measuring distance error, the processing unit 5 obtains the values of A, B, θ, {ai}, and {bi} to temporarily store these values in the storage unit 4 (S105).

Furthermore, the processing unit 5 compares each of the values A and B stored in the storage unit 4 with a threshold value accumulated in the storage unit 4 (or inputted from an external device) to determine that control goes to step S107 or S108 or the processing is terminated (S106). For the termination of the processing, the processing unit 5 obtains the position (x0, y0) from the storage unit 4 and controls the positioning unit to output this item as the position thereof. It is also possible that the positioning error (A, B, θ) is outputted from the positioning unit.

The processing unit 5 reads A, B, {ai}, and {bi} from the storage unit 4 and determines order {ord(i)} of base stations that will improve positioning error according to A, B, {ai}, {bi}, and the maximum number (sup_ord) of the bases stations for the redetection stored in the storage unit 4 (or inputted from an external device). The processing unit 5 temporarily stores the order {ord(i)} of base stations in the storage unit 4 (S109).

According to the order {ord(i)} in the storage unit 4, the processing unit 5 re-detects, as in the operation of the processing unit 5 in step (S102), a signal from each of the base stations {BSORD(I)} that will improve positioning error, and then the delay profile generator 2 generates a delay profile for each of these base stations (S110).

The processing unit 5 renews {tORD(I)} using each determined value of propagation time from the propagation time measurement unit 3 and {wORD(I)} and {tORD(I)} from the storage unit 4 and then temporarily stores the renewed {tORD(I)} in the storage unit 4 (S111). Moreover, according to the noise power from the receiver 1, each signal power from the delay profile generator 2, {wi} temporarily stored in the storage unit 4, and the SNR-σ table, the processing unit 5 renews {wORD(I)} to temporarily store the renewed {wORD(I)} in the storage unit 4 (S111).

According to {(xi, yi)} and {tORD(I)} stored in the storage unit 4, the processing unit 5 calculates the position (x0, y0) of the positioning unit and then temporarily stores the position (x0, y0) in the storage unit 4 (S112).

Figure 4:
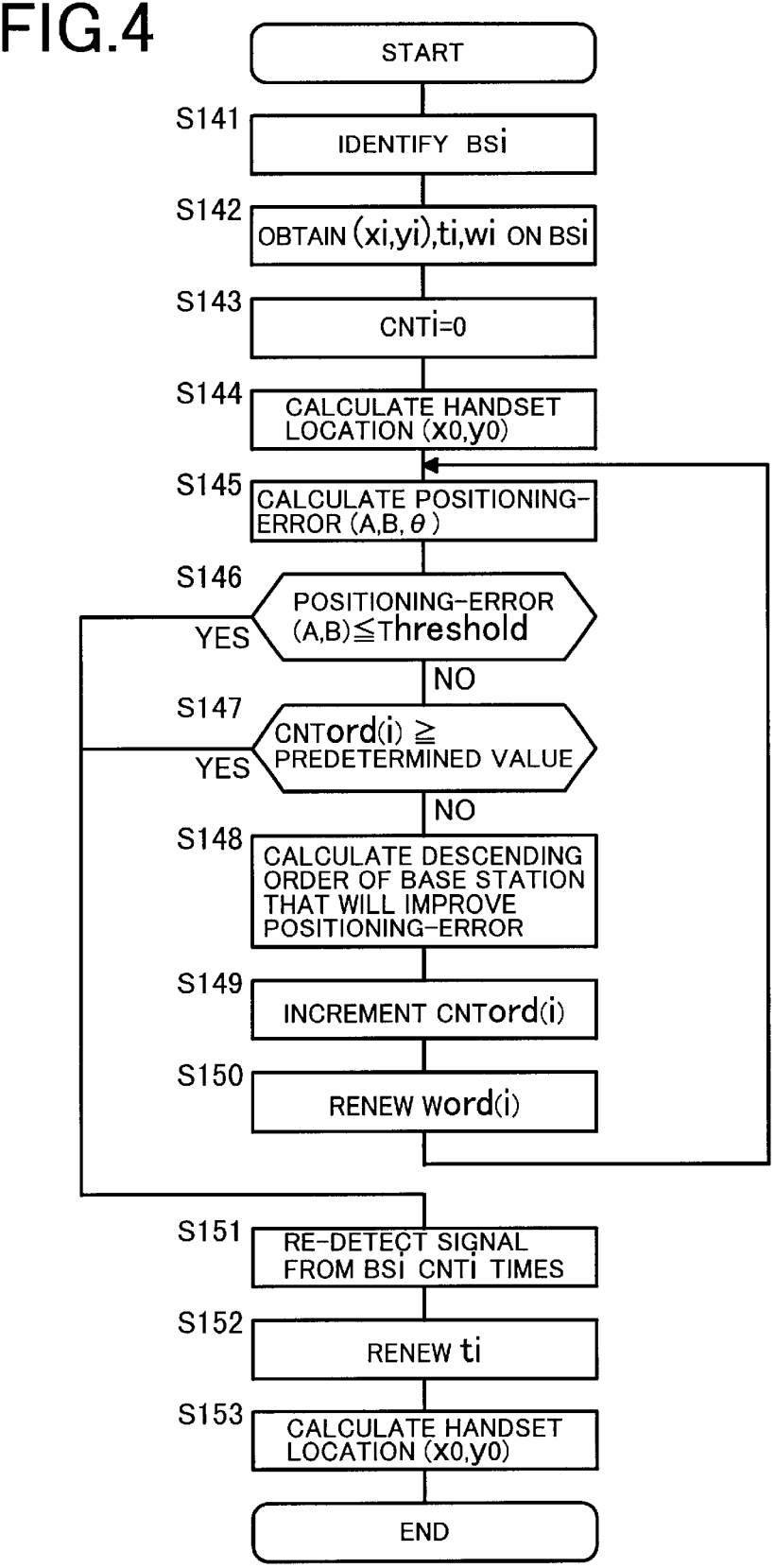
FIG. 4 is a flowchart of a different positioning method in the first embodiment of the present invention.

FIG. 4 shows in a flowchart another positioning method in the first embodiment of the present invention.

If the standard deviation for the detected base station is assumed to be fixed, it will be efficient that the combination of base stations of which the error is equal to or less than a predetermined error and the number of redetection for the base stations are first calculated and then signals are redetected from the base stations. The difference between the positioning method shown in FIG. 4 and the positioning method shown in FIG. 2 resides in the steps S143, S149, and S151 using the number of redetection CNT.

In steps S141 to S144, an approximate position of the positioning unit is obtained. The positioning unit receive (detects) a signal from each base station to identify the base station (BSi) as a signal source (S141).

The positioning unit then determines the propagation time (ti) of the signal from each base station reads the position (xi, yi) of the base station BSi from the storage unit 4 according to an identifier number of the identified base station, sets as a predetermined value (prm_w) an inverse number (wi) of a calculated value of the standard deviation about measuring distance error associated with the determination of propagation time, and substitutes prm_w for wi (S142). That is, n base stations detected in step S141 are indicated as BS1, BS2, ..., BSn; the locations of the respective base stations are indicated as (x1, y1), (x2, y2), ..., (xn, yn), each of the inverse numbers w1, w2, ..., wn of estimators of standard deviation about measuring distance errors on the respective base stations is replaced by prm_w, and the propagation delay time of the signals from the respective base stations are indicated as t1, t2, ..., tn.

Additionally, the counters indicating the number of redetection required for the n detected base stations are indicated as CNT1, CNT2, ..., CNTn and then the counter values thereof are initialized to zero (S143).

Next, according to the location (xi, yi) of each detected base station and the propagation time (ti) of the signal from each base station, the location (x0, y0) of the positioning unit is calculated (S144). The location of the positioning unit can be calculated, for example, using the method described in JP-A-7-181242.

Moreover, the positioning error (A, B, θ) is calculated in a method similar to the positioning method described for step S105 of FIG. 2 (S145). The positioning error A is a component of error in the direction of the x' axis drawn by rotating the x axis counterclockwise by an angle of θ and the positioning error B is a component of error in the direction of the y' axis orthogonal to the x' axis.

In step S146, a check is made to determine termination of the processing for the combination of base stations and for the number of redetection of each base station. If each of the estimated positioning errors A and B calculated in step S145 is equal to or less than a predetermined threshold value ("yes" in step S146), control goes to steps S151.

On the other hand, if either one of the values A and B is more than the predetermined value ("no" in S146), the number of redetection CNTORD(I) is checked (S147) and then control goes to step S148.

In this regard, it is also possible in step 146 that a value of $A^2+B^2$ or a square thereof is compared with a threshold value without comparing each of the values A and B with a threshold value.

A check is made to determine whether or not the number of redetection CNTORD(I) has reached a predetermined value (S147). The counter is disposed to prevent occurrence of an event in which neither of the positioning errors A and B is decreased below the threshold value even after the positioning operation from step S145 to step S150 and the processing enters an infinite loop. That is, when the processing of these steps is executed for predetermined times, the processing is terminated.

In step S145, order {ord(i)} of base stations that will improve positioning error are calculated for the positioning errors obtained in step S145 (S148). The order {ord(i)} are obtained in a procedure described in conjunction with FIG. 3.

For each base station that will improve positioning error, a predetermined value of increment (prm_step) of the number of redetection is added to the number of redetection (CNT) as below (S149).

$$CNT_{ord(i)}=CNT_{ord(i)}+prm\_step, (i=1,2,\ldots,m) \quad (15)$$

Additionally, the inverse number wi of the standard deviation about measuring distance error is renewed as follows (S150).

$$w_i=\sqrt{w_i^2+prm\_step \times prm\_w^2} \quad (16)$$

Returning to step S145, the positioning error (A, B, θ) is calculated again (S145) and a check is made to determine whether or not the positioning error is equal to or less than the threshold value (S146).

For example, in a case of sup_ord=1 and prm_step=1, expression (15) becomes $$CNT_{ord(i)}=CNT_{ord(i)}+1 \quad (17)$$

and expression (16) becomes $$w_i=\sqrt{w_i^2+prm\_w^2} \quad (18)$$

When it is determined in steps S146 and S147 that the calculation of the counter {CNTi} (S149) is to be terminated, control goes to step S151. The signal from each of the base stations BSi (i=1, 2, ..., n) is redetected CNTi times (S151), and the propagation time ti of a signal from each base station is determined CNTi times using the redetected signals to obtain respective results ti(1), ti(2), ..., ti(CNTi) in step S151. For each base station of which the signal is redetected, the system calculates a mean value of the determined results of propagation times of the signals from the base stations and the results obtained in step S142. That is, ti is renewed as ti={ti+ti(1)+. . . +ti(CNTi)}/{1+CNTi} in step S152.

According to the pair of coordinates (xi, yi) of each base station and the propagation time ti of the signal from the base station, the position (x0, y0) of the positioning unit is calculated (S153) to be outputted as the position of the positioning unit. Moreover, it is also possible to configure the system such that the positioning unit outputs the positioning error (A, B, θ).

Subsequently, description will be given of operation of the positioning unit (FIG. 1) to execute the positioning method described in conjunction with FIG. 4.

In steps S141 to S144, the processing unit 5 obtains {(xi, yi)}, {ti}, {wi}, and (x0, y0) as in the operation thereof in steps S102 to S104 of the positioning method shown in FIG. 2 and then temporarily stores the obtained items in the storage unit 4 (S142 and S144). Also, the processing unit 5 initializes all {CNTi} to zero and temporarily stores {CNTi} in the storage unit 4 (S143).

In step S145, the processing unit 5 executes processing as in step S105 of the positioning method shown in FIG. 2.

Moreover, the processing unit 5 compares each of the values A and B stored in the storage unit 4 with a threshold value accumulated in the storage unit 4 (or inputted from an external device) to determine that control goes to step S147 or S148 or the processing is terminated (S146).

In step S148, the processing unit 5 executes processing as in step S109 of the positioning method shown in FIG. 2.

The processing unit 5 reads {ord(i)}, {CNTi}, {wi}, prm_w, and prm_step from the storage unit 4, renews {CNTi} and {wi} according to these values, and temporarily stores the renewed values in the storage unit 4 (S149 and S150).

In steps S151 to S153, the processing unit 5 executes processing using {CNTi} stored in the storage unit as in steps S102 to S104 of the positioning method shown in FIG. 2. That is, a delay profile is generated for each base station {BSi}, and the signal redetection is conducted {CNTi} times for each base station (S151). The processing unit 5 renews {ti} using the determined values of propagation times from the propagation delay measurement unit 3 and {ti} and {CNTi} in the storage unit 4 (S152). According to {ti} and {(xi, yi)} in the storage unit 4, the processing unit 5 calculates the position (x0, y0) of the positioning unit and controls the positioning unit to output the position (x0, y0) in step S153. It is also possible that the processing unit 5 controls the positioning unit to output A, B, and θ from the storage unit 4.

As above, the positioning unit of the first embodiment includes a receiver unit 1 for receiving a signal from a base station, a delay profile generator 2 for generating a delay profile of the signal from the base station, a propagation time measurement unit 3 for analyzing the delay profile and for thereby determining propagation delay time of the signal, a storage unit 4 for storing data required to calculate a position of the positioning unit, and a processing unit 5 for controlling the receiver unit 1, the delay profile generator 2, the propagation time measurement unit 3, and the storage unit 4 for processing various data used to calculate the position and for thereby conducting a positioning operation. The processing unit 5 includes a positioning device for obtaining a position of the positioning unit according to the propagation delay time measured by the propagation time measurement unit 3, a standard deviation calculating device for calculating a standard deviation about measuring distance error associated with the measurement of the propagation delay time, an error calculating device for calculating a positioning error of the positioning unit according to the position of base station detected, the position of the positioning unit calculated by the position calculating device, and the standard deviation calculated by the standard deviation calculating device, and a determining device to determine base stations in directions nearer to a direction in which the positioning error is large according to the positioning error calculated by the error calculating device. The positioning device re-calculates the position of the positioning unit according to signals from the re-detected base stations in directions nearer to a direction in which the positioning error is large.

Therefore, a signal from each base station is detected (S102), the propagation delay time of the signal from the base station is determined and the position of the positioning unit is calculated and the standard deviation about measuring distance error associated with the determination of the propagation delay time is calculated (S103), the positioning error of the positioning unit is calculated according to the position of each base station, the position of the positioning unit, and the standard deviation about measuring distance error (S104 and S105), base stations in directions nearer to the direction of largest positioning errors are obtained according to the calculated positioning error of the positioning unit (S109), signals from the obtained base stations in directions nearer to the direction of largest positioning errors are redetected (S110), and the position of the positioning unit is re-calculated (S112). Therefore, the correct position of the positioning unit can be measured while preventing the increase in the period of time and the consumption power required for the positioning operation.

Furthermore, according to a result of comparison between the calculated positioning error of the positioning unit and the predetermined value, the termination of the positioning operation is determined (S106). Therefore, the result of positioning operation can be obtained with a positioning error equal to or less than a fixed value.

Additionally, according to each propagation delay time measured by the re-detecting the signal from each of the base stations in directions nearer to the direction of largest positioning errors (S110), the standard deviation about measuring distance error associated with the determination of the propagation delay time, the determined values of the propagation delay time of the base stations determined before the redetection, the standard deviation about measuring distance error calculated before the redetection, and the position of each base station, the position of the positioning unit is calculated. Furthermore, for each of the base stations that will improve positioning error, the determined value of the propagation delay time and the calculated value of the standard deviation about measuring distance error are renewed (S111), and then the position of the positioning unit is re-calculated. Therefore, the positioning error of the positioning unit can be reduced by few computing operations (S112).

Moreover, a direction in which the calculated positioning error of the positioning unit is large is calculated (S105) and base stations transmitting signals from the direction are obtained as the base stations in directions nearer to the direction of largest positioning errors. That is, according to the calculated positioning error and a quotient obtained in association with the standard deviation about measuring distance error in a direction cosine for the positioning unit, order of the base stations in directions nearer to the direction of largest positioning errors is obtained (S105). It is therefore possible to select base stations which remarkably contribute to reduction of the positioning error of the positioning unit by few computing operations.

In the positioning method described in conjunction with FIG. 4, a signal from each base station is detected (S141), the propagation delay time of the signal from the base station is determined and the position of the positioning unit is calculated and the standard deviation about measuring distance error associated with the determination of the propagation delay time is calculated (S142), the positioning error of the positioning unit is calculated according to the position of each base station, the position of the positioning unit, and the standard deviation about measuring distance error (S144), base stations in directions nearer to the direction of largest positioning errors are obtained according to the calculated positioning error of the positioning unit (S148), the positioning error is calculated, for each of the base stations in directions nearer to the direction of largest positioning errors, for the re-detection of the signal from each of the base stations and the number of redetection to re-detect the signal from each base station is calculated (S149, S150, and S146), and signals from each of the base stations are redetected as many times as indicated by the number of redetection. According to each measured propagation delay time, each standard deviation about measuring distance error associated with the measurement of the propagation delay time, the propagation delay time of each base station measured before the redetection, the standard deviation about measuring distance error calculated before the redetection, and the position of each base station (wireless transmitters), the position of the positioning unit is re-calculated (S151 to S153). That is, after the trial calculation is conducted to obtain the reduction of the positioning error associated with the number of detection of the signal from each base station, the signal from the base station is re-detected and then the position of the positioning unit is re-calculated. Therefore, the correct positioning of the positioning unit can be measured by removing unnecessary computing operations.

Additionally, a direction in which the calculated positioning error of the positioning unit is large is calculated and base stations transmitting signal from the direction are obtained as the base stations in directions nearer to the direction of largest positioning errors (S148). That is, according to the calculated positioning error and a quotient obtained in association with the standard deviation about measuring distance error in a direction cosine for the positioning unit, order of the base stations in directions nearer to the direction of the largest positioning errors is obtained (S148). It is therefore possible to select base stations which remarkably contribute to reduction of the positioning error of the positioning unit by few computing operations.

Figure 5:
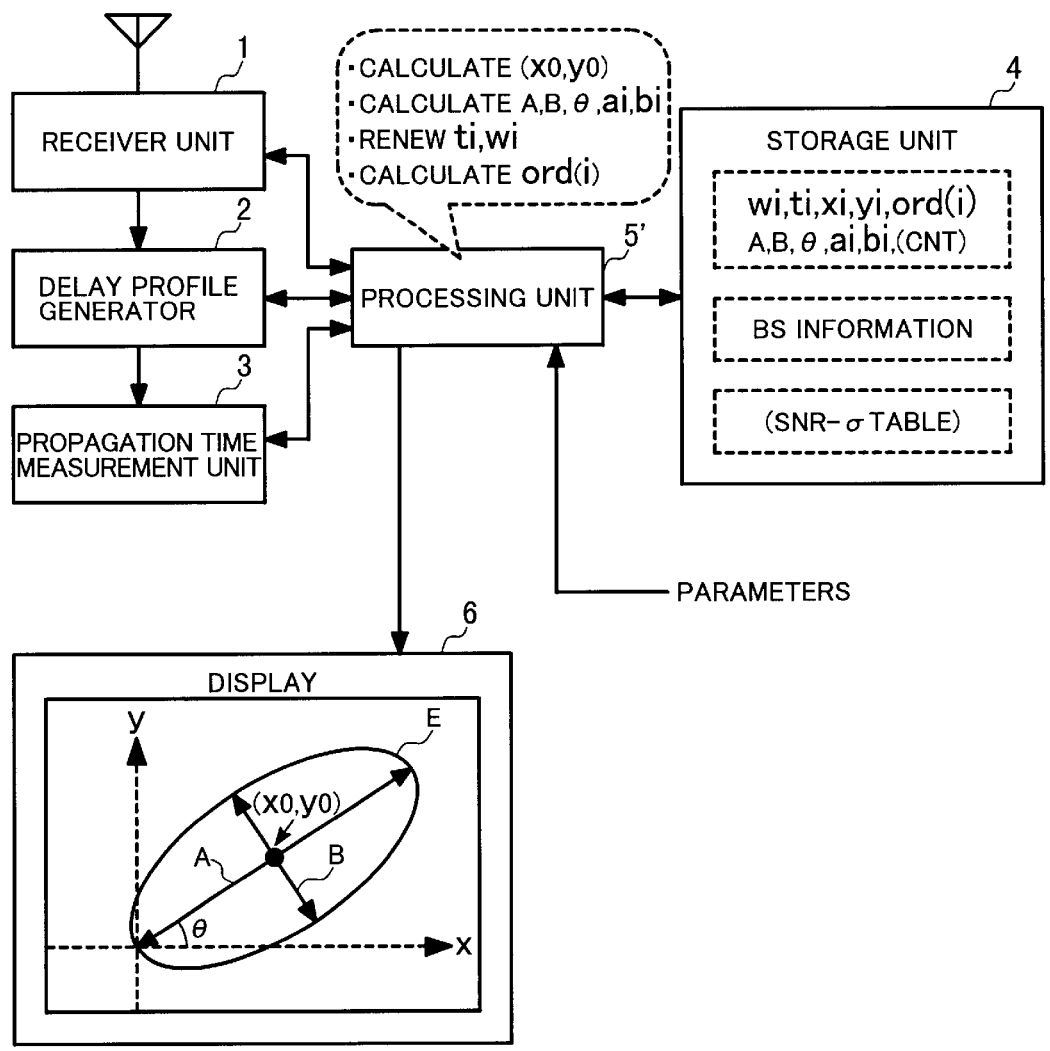
FIG. 5 is block diagram of a second embodiment of a positioning unit according to the present invention.

FIG. 5 shows a main configuration of the positioning unit in a second embodiment of the present invention in a block diagram. As distinct from the positioning unit of the first embodiment (FIG. 1), this embodiment includes a display unit 6. In FIG. 5, the same constituent components as those of FIG. 1 are assigned with the same reference numerals and conduct the same operation, and hence detailed description thereof will be avoided. When outputting the position (x0, y0) of the positioning unit, a processing unit 5' obtains an elliptic curve E indicating the positioning errors using the positioning error (A, B, θ) accumulated in the storage unit 4 and outputs the positioning errors therefrom. The elliptic curve E is expressed as follows.

$$\frac{(x\cos\theta - y\sin\theta)^2}{A^2} + \frac{(x\sin\theta - y\cos\theta)^2}{B^2} = 1 \qquad (19)$$

The display unit 6 displays the position (x0, y0) of the positioning unit and the elliptic curve E on the x-y plane. That is, the positioning display unit of the second embodiment functions as a positioning error display unit to display a direction in which the positioning error is large.

Incidentally, the elliptic curve can also be displayed in a magnified or minimized image thereof. For example, the elliptic curve is represented as follows.

$$\frac{(x\cos\theta - y\sin\theta)^2}{-2A^2\log_e(1-P)} + \frac{(x\sin\theta + y\cos\theta)^2}{-2B^2\log_e(1-P)} = 1 \qquad (20)$$

In this expression, P is a cumulative probability of positioning error and indicates a probability of an event in which the positioning results are contained in the elliptic curve E drawn by expression (2). Also, the display unit 6 can be so constructed to display the probability P.

Figure 6:
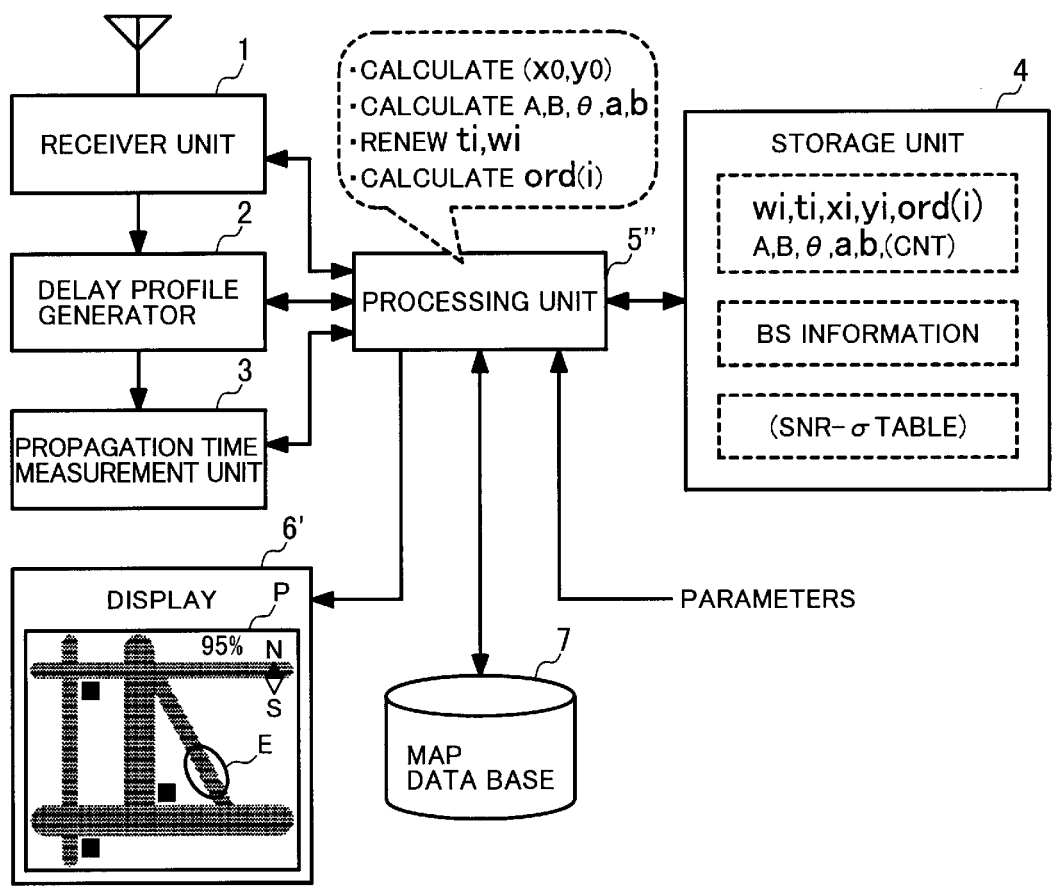
FIG. 6 is block diagram of another embodiment of a positioning error display unit according to the present invention.

FIG. 6 shows a main configuration of the positioning unit in a third embodiment of the present invention in a block diagram.

As distinct from the positioning unit of the second embodiment (FIG. 5), this embodiment includes a map database 7. In FIG. 6, the same constituent components as those of the first embodiment (FIG. 1) and the second embodiment (FIG. 5) are assigned with the same reference numerals and conduct the same operation, and hence detailed description thereof will be avoided.

A processing unit 5" reads map data from the map database according to the position (x0, y0) of the positioning unit and then outputs the map data and the elliptic curve E indicating estimated positioning errors to a display unit 6'. That is, the processing unit 5" superimposes the error indicator by elliptic curve onto the map data from the map database 7 to produce map data and then outputs the obtained map data to the display unit 6'. The display unit 6' displays the map data and the error indicator by elliptic curve such that the positioning unit serves as a positioning error display unit to display positioning errors. Moreover, it is also possible to easily identify the location of the positioning unit by displaying the superimposed image of the map information and the error indicator by elliptic curve. For example, in FIG. 6, the major axis of the error indicator by elliptic curve extends in the north-northwest (south-southeast) direction and a road exists in the vicinity of the error indicator by elliptic curve and extends in the same direction. Therefore, it is highly possible that the positioning unit exists on the road.

Moreover, the system can also be constructed such that the processing unit 5" controls the scale of the displayed map to appropriately display an ellipse on the display unit 6' according to parameters A, B, and P of the error indicator by elliptic curve.

It is also possible that the ellipse E is obtained using expression (20) and the probability P is displayed on the display unit 6'.

Figure 7:
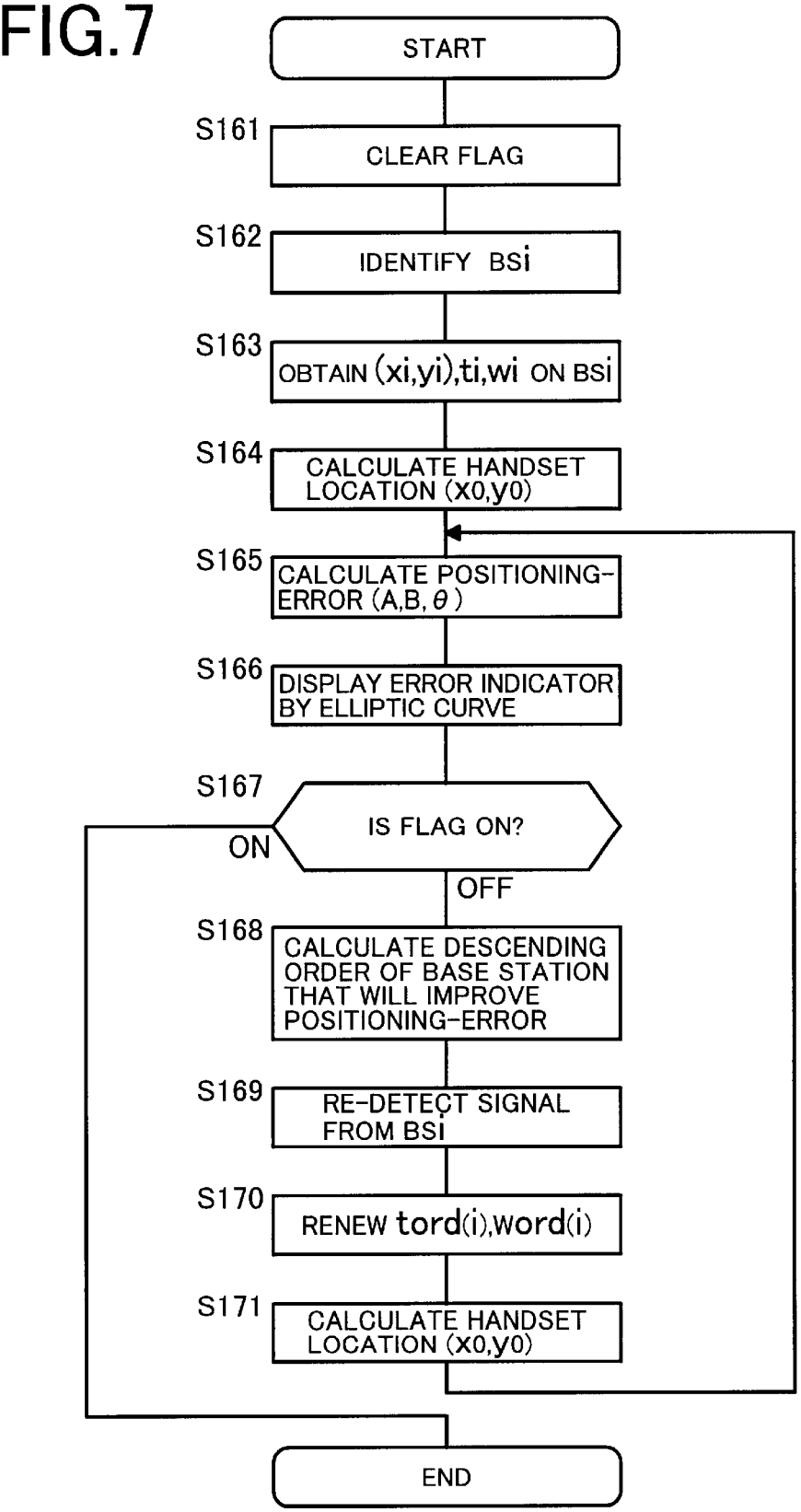
FIG. 7 is a flowchart showing another positioning method according to the present invention.

FIG. 7 shows a positioning method of the positioning unit in the second or third embodiment of the present invention in a flowchart.

As distinct from the positioning method of the first embodiment (FIG. 2), the positioning method of FIG. 7 includes steps S166 and S167. In FIG. 7, the same steps as those of FIG. 2 will not be described.

In the positioning method, an end flag is first set to off (S161). The positioning error display unit calculates the positioning error (A, B, θ) in step S165 and then renews the display of the ellipse E corresponding to the positioning error (S166). Thereafter, when it is determined that the end flag is on (S167), the positioning calculation is terminated.

The user confirms the estimated value of the positioning error by visually checking the ellipse E displayed on the display unit 6', the ellipse E becoming gradually smaller by the repetitious positioning operations through steps S165 to S171. When the error reaches a satisfactory level for the user, the user sets the end flag, i.e., a parameter to be inputted to the processing unit 5" on to terminate the positioning calculation. The input parameter may be set using, for example, a keyboard.

As above, the positioning unit of the second embodiment includes a receiver unit 1 to receive a signal from each base station, a delay profile generator 2 to generate a delay profile of the signal from the base station, a propagation time measurement unit 3 which analyzes the delay profile to determine propagation delay time of the signal, a storage unit 4 to store data necessary for the positioning unit to calculate a position, a display unit 6 to display results of the positioning operation, and a processing unit 5 which controls the receiver unit 1, the delay profile generator 2, the propagation time measurement unit 3, the storage unit 4, and the display unit 6 and which processes various data to calculate a position to thereby achieve the positioning operation. The processing unit 5 calculates the position of the positioning unit and the positioning error, and calculates an ellipse indicating a range of error by use of the positioning error. The display unit 6 displays the position of the positioning unit and the range of error. Therefore, the position of the positioning unit can be correctly measured and the positioning error can be checked by the user, and hence it is possible for the user to determine continuation or termination of the positioning operation according to the displayed information.

Furthermore, the positioning unit of the third embodiment includes a receiver unit 1 to receive a signal from each base station, a delay profile generator 2 to generate a delay profile of the signal from the base station, a propagation time measurement unit 3 which analyzes the delay profile to determine propagation delay time of the signal, a storage unit 4 to store data necessary for the positioning unit to calculate a position, a display unit 6' to display results of the positioning operation, a map database 7 storing map information, and a processing unit 5" which controls the receiver unit 1, the delay profile generator 2, the propagation time measurement unit 3, the storage unit 4, the display unit 6', and the map database 7 and which processes various data to calculate a position to thereby achieve the positioning operation. The processing unit 5" calculates the position of the positioning unit and the positioning error, calculates an ellipse indicating a range of error by use of the positioning error, and selects from the map database 7 map information in a range including the error indicator by elliptic curve. The display unit 6' displays the position of the positioning unit, the error indicator by elliptic curve, and the map information. Therefore, the position of the positioning unit and the error can be correctly measured and the positioning error can be checked by the user, and hence it is possible for the user to determine continuation or termination of the positioning operation according to the displayed information.

Additionally, the display unit 6' displays a probability of inclusion of the position of the positioning unit in the error indicator by elliptic curve. Therefore, precision or accuracy of the calculated position can be easily recognized.

Figure 8:
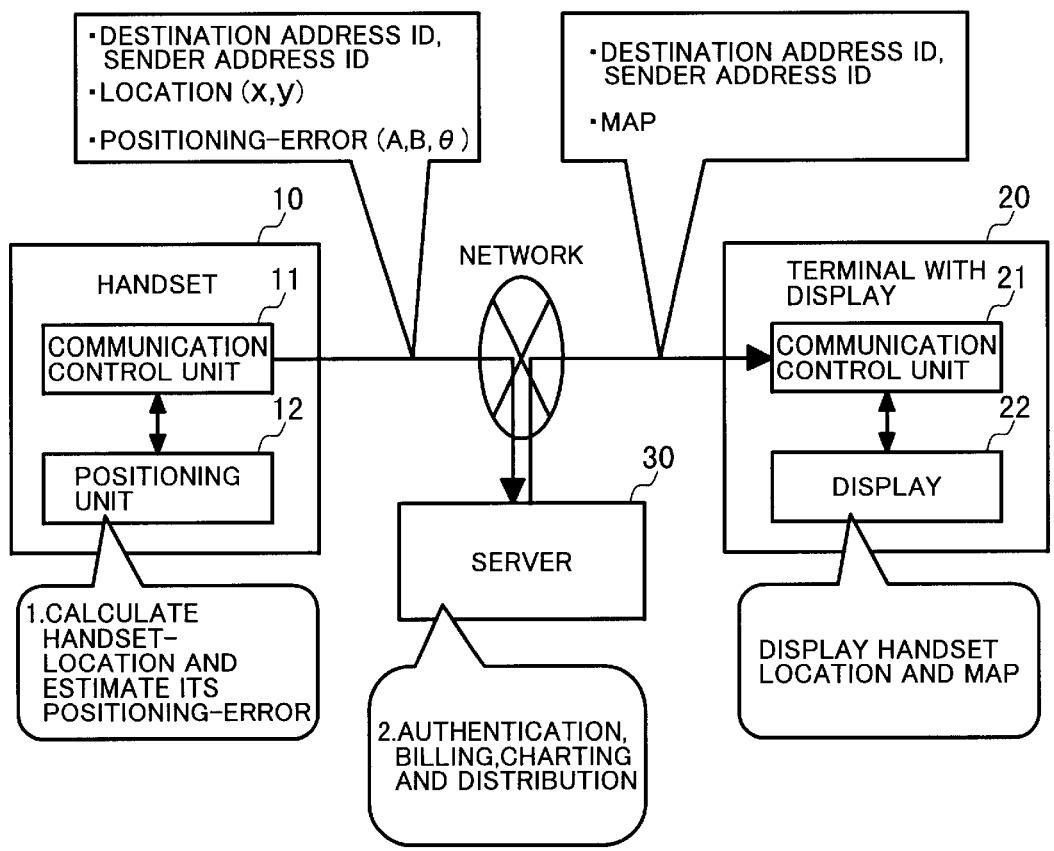
FIG. 8 is block diagram showing a fourth embodiment of a location information supplying system according to the present invention.

FIG. 8 shows a main configuration of a position information supplying system in a fourth embodiment of the present invention in a block diagram.

In the configuration, the calculation and the display of the estimated positioning error may be conducted by two or more units. Such units may be distributed in the system according to uses of the system. The position information supplying system in the fourth embodiment is a position information supplying system employing the position detecting method according to the first to third embodiments.

In the position information supplying system of the fourth embodiment, a handset 10 includes a positioning unit 12 according to the first embodiment and a communication control unit 11 to communicate via a communication network with a server 30. A terminal with display 20 includes a communication control unit 21 to communicate via a communication network with a server 30 and a display 22 to display a map including the position of the handset 10 and the error indicator by elliptic curve E.

Figure 9:
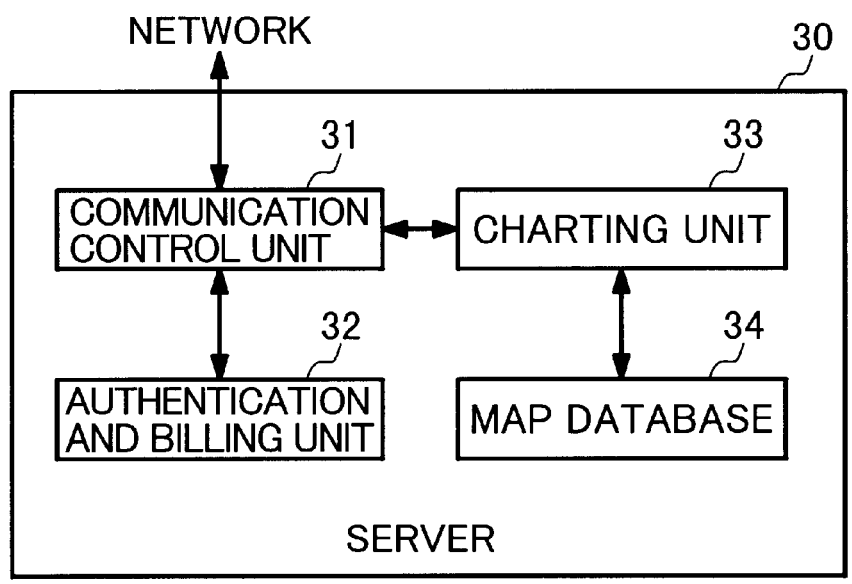
FIG. 9 is a block diagram showing a server employed in the location information supplying system shown in FIG. 8.

The server 30 includes, as shown in FIG. 9, a communication control unit 31 to communicate via a communication network with another terminal device, an authentication and billing unit 32 to conduct authentication and billing operation according to identifier information of the handset 10, a map database 34, and a charting unit 33 which accesses the map database 34 according to the position and the error indicator by elliptic curve E to select map data corresponding to the error indicator by elliptic curve E therefrom to add the error indicator by elliptic curve E to the map.

Although the configuration includes a positioning unit according to the first embodiment, it is also possible to use a positioning unit according to the second or third embodiment. In such a case, if the system is constructed such that the server 30 sends the map data to the handset 10 and the terminal with display 20, it is not required to store the map data in the handset 10.

Next, description will be given of operation of a position information supplying system in the fourth embodiment.

Figure 10:
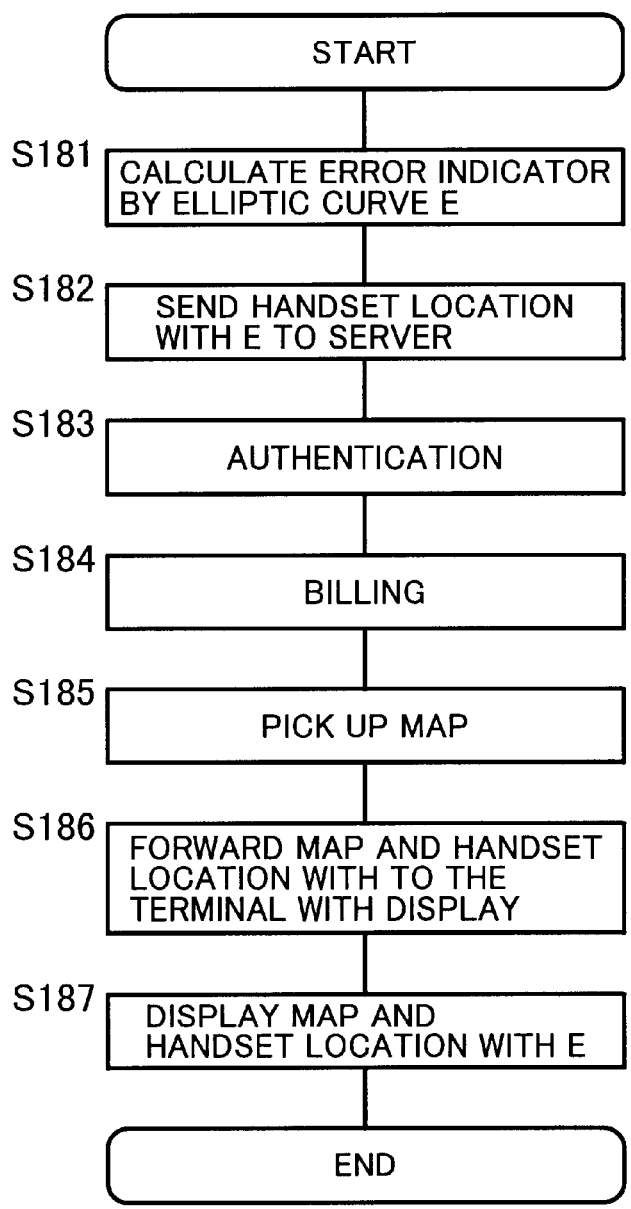
FIG. 10 is a block diagram showing operation of the location information supplying system shown in FIG. 8.

FIG. 10 shows operation of a position information supplying system in the fourth embodiment in a flowchart.

The handset 10 calculates the position (x0, y0) of the handset 10 and the parameters (A, B, θ) of the error indicator by elliptic curve E indicating an estimated error (S181). The handset 10 sends to the server 30 a message including identifier information (terminal ID) of the handset 10 as a transmission source of position information, identifier information (a telephone number, an e-mail address, or the like) of the terminal with display 20 as a destination of position information, and the parameters (A, B, θ) of the error indicator by elliptic curve E (S182).

Next, the server 30 conducts authentication according to the identifier information of the handset 10 in the message (S183), and conducts a billing operation when required (S184). The server then accesses the map database 34 to selects therefrom map data including the error indicator by elliptic curve E according to the position (x0, y0) of the handset 10 and the error indicator by elliptic curve E to draw the error indicator by elliptic curve E on the map (S185). The server 30 transfers, to the terminal with display 20 as the destination, the identifier information (terminal ID) of the handset 10 as the source, the identifier information (a telephone number or the like) of the terminal with display 20 as the destination, and the map data including the error indicator by elliptic curve E (S186).

The terminal with display 20 displays the map including the error indicator by elliptic curve E on the display 22 (S187).

As above, the position information supplying system of the fourth embodiment is a positioning information supplying system including a handset 10 including a positioning unit 12 to calculate a position thereof using propagation delay time of signals from a plurality of base stations, a server 30 to supply map information, a terminal with display 20 to supply position information detected by the handset 10 for visual recognition of the user, and a communication network to connect the handset 10, the server 30, and the terminal with display 20 to each other for communication therebetween. The positioning unit 12 includes means to determine base stations in directions nearer to the direction of largest positioning errors and positioning means to re-detect signals from the base stations in directions nearer to the direction of largest positioning errors to re-calculate the position of the handset 10. The server 30 includes map information output means to select, according to the position of the positioning unit 12, map information corresponding to the position. The terminal with display 20 displays the position of the positioning unit 12 and the map information such that the user can recognize the displayed items. Therefore, the positioning unit 12 determines base stations in directions nearer to the direction of largest positioning errors and then re-calculates the position of the handset 10 to output the calculated position information to the communication network. The server 30 displays on the display 22 the result of the positioning operation received via the communication network from the positioning unit 12 and the map information outputted from the server 30 in association with the result of the positioning operation. Consequently, the user of the terminal with display 20 can make a search for an actual position of the handset 10 at another position. Since the map database can be controlled in a concentrated fashion, even if the position information supplying system includes a plurality of handsets 10 and a plurality of terminals with display 20, maintenance of the map database can be easily conducted.

Furthermore, the positioning unit 12 outputs the position of the handset 10 and the positioning error, the server 30 (map information output means) selects and outputs map information in a range including elliptic curve calculated according to the positioning error, and the terminal with display 20 displays the position of the handset 10, the error indicator by elliptic curve, and the map information. Therefore, a correct position of the handset 10 can be measured, and it is possible for the user to recognize the positioning error. Consequently, the user can determine continuation or termination of the positioning operation according to the positioning error.

The server 30 employed in the position information supplying system of the fourth embodiment is a server 30 connected via a communication network for communication to a handset 10 including a positioning unit 12 which determines wireless transmitters in directions nearer to the direction of largest positioning errors by use of propagation delay time of signals from a plurality of base stations and re-detects signals from the determined wireless transmitters in directions nearer to the direction of largest positioning errors to thereby calculate the position of the positioning unit 12 and a terminal with display 20 to present the position information detected by the handset 10 to the user. The server 30 includes a communication control unit 31 to communicate via a communication network with another terminal device and a charting unit 33 which reads map information from a map database 34 to supply the map information. The charting unit 33 selects, according to the positioning error (position information) of the handset 10 calculated by the positioning unit 12, map information corresponding to the positioning error, and the communication control unit 31 outputs the map information to the terminal with display 20. Therefore, the user of the terminal with display 20 can detect the position of the handset 10 at another position to confirm the position and the positioning error of the handset 10 on the map.

Also, the server 30 includes an authentication and billing unit 32 to conduct authentication and billing operation according to the identifier information of the handset 10. The authentication and billing unit 32 generates billing data according to a state of use of the map information. This ensures the billing operation for the use of map information.

Subsequently, an advantage of the positioning method of the present invention will be described in conjunction with a computer simulation of the positioning method.

A target positioning accuracy is that a 67% value of a cumulative distribution of positioning error is equal to or less than 50 meters (m). This is a condition described in "Enhanced 911 (E911) Phase II requirements published from Federal Communications Commission (FCC) on 15th Sep., 1999.

Assume the simulation conditions (in meters) as follows.
Actual position of handset: (x0, y0) =(1500, 130) Base stations detected in first step: BS1, BS2, BS3 Position of each base station: (x1, y1)=(0, 0); (x2, y2)=(2000, 0); (x3, y3)=(1750, 2000)
Inverse number of standard deviation about measuring distance error on each base station: w1=w2=w3=1/42

The propagation delay time of each base station determined at signal detection by the handset 10 is obtained by adding noise independently assigned to each base station to a value obtained by dividing the distance between the handset 10 and the base station by the light velocity. Assume that the mean value of the noise is zero and the noise occurs according to a normal distribution with a standard deviation of 0.14 microsecond ($\mu$s).

Figure 11:
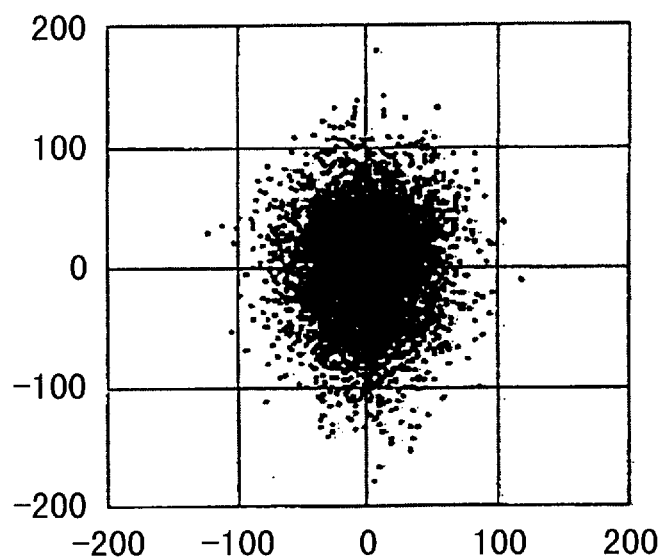
FIG. 11 is a graph showing a distribution of positioning errors in a positioning method not according to the present invention.

FIG. 11 is a graph showing the error distribution of results of positioning operation of the handset 10 calculated by step S104 of FIG. 2. In FIG. 11, the abscissa is an x axis, the ordinate is a y axis, and the number of samples is 5000. In this case, the 67% value of the cumulative distribution of positioning error is 55 m. This does not satisfy the target accuracy.

When steps S105 and S109 of FIG. 2 are executed, the results of these operations indicate that the base station BS3 will most improve positioning error. For example, for (x0, y0)=(1500, 130), when the positioning operation results in A=30 m, B=44 m, θ=2.7°, b=−0.0032, b2=−0.0049, and b3=0.024.According to these parameters of elliptic curve and the relative positions of the handset 10 and each base stations, it is determined that the base station existing in the direction of the major axis B of the ellipse is BS3.

Figure 12:
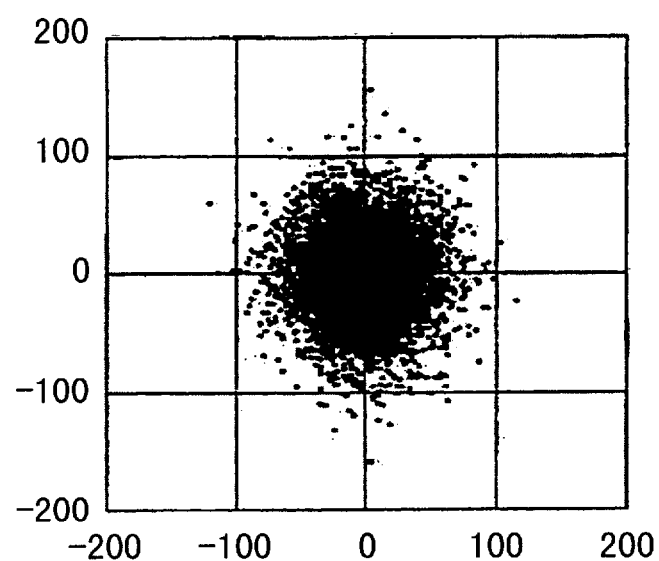
FIG. 12 is a graph showing a distribution of positioning errors in a positioning method according to the present invention.

Next, steps S110 to S112 of FIG. 2 are executed. That is, for the base station BS3 determined as a base station that will most improve positioning error, a signal is re-detected to determine the propagation delay time. The propagation delay time of the signal from the base station is thereby re-determined to measure the position of the handset 10. FIG. 12 shows a distribution of errors resulted from the positioning operation. In this case, the 67% value of the cumulative distribution of positioning error is 48 m and hence the target accuracy is satisfied.

Figure 13:
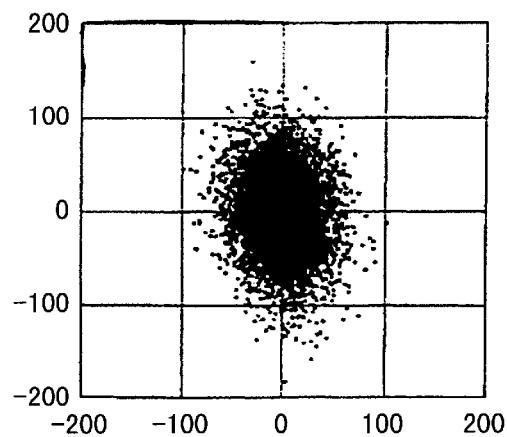
FIG. 13 is a graph showing a distribution of positioning errors in a positioning method not according to the present invention.
Figure 14:
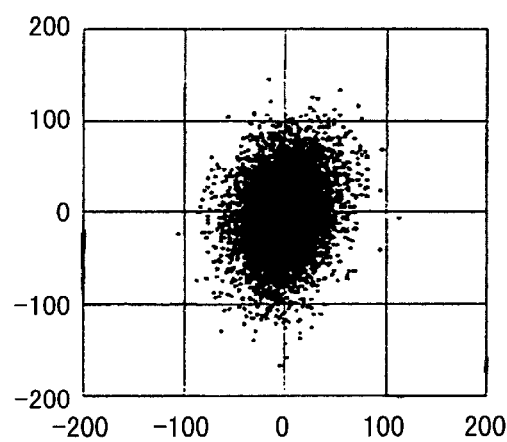
FIG. 14 is a graph showing a distribution of positioning errors in a positioning method not according to the present invention.

On the other hand, FIGS. 13 and 14 show error distributions obtained by re-executing the positioning operation without any estimation of improvement of positioning error. FIGS. 13 and 14 are the error distributions resultant from the re-execution of the positioning operation respectively for the base stations BS1 and BS2 in almost the same way as for the base station BS3. In either one of the cases, the 67% value of the cumulative distribution of positioning error is 51 m and hence the target accuracy is not satisfied.

Figure 15:
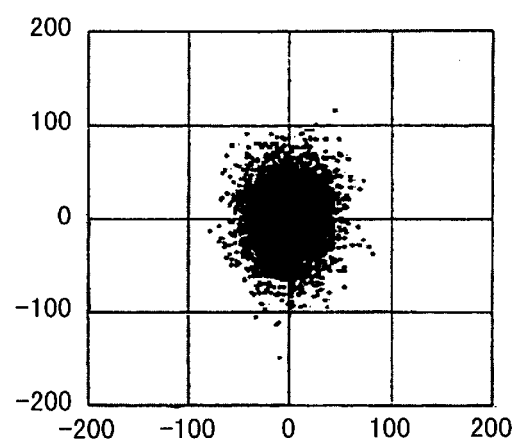
FIG. 15 is a graph showing a distribution of positioning errors obtained by again positioning all base stations.

FIG. 15 shows an error distribution resulted from the re-execution of the positioning operation by re-detecting signals from all base stations. In this case, the 67% value of the cumulative distribution of positioning error is 39 m and hence the target accuracy is satisfied. However, most of the processing executed up to the point at which the result of the positioning operation is obtained is used to generate the delay profiles. Therefore, when the signals are re-detected for all base stations (three base stations in this case) to re-conduct the positioning operation, there must be executed processing about three times as much as the processing executed when the signal is re-detected for one base station to re-conduct the positioning operation. The period of time for the processing to detect the position is accordingly elongated and the consumption power is increased. This deteriorates efficiency of the positioning operation.

According to the present invention, a base station that will improve positioning error is beforehand determined through calculation and then reception timing of a signal from the base station is re-measured to improve accuracy of the positioning operation. Therefore, the accuracy of the positioning operation can be improved while preventing the increase in the period of time required for the positioning operation and in the consumption power.

Other representative aspects of the present invention are as follows.

(1) A positioning method of calculating a position of a receiver according to propagation delay time of signals from a plurality of wireless transmitters includes a first step of detecting a signal from each of the wireless transmitters, obtaining a position of each of the wireless transmitters from which the signal is detected, measuring propagation delay time of the signal from each of the wireless transmitters, and calculating a position of the receiver and a standard deviation about measuring distance error associated with the measurement of the propagation delay time; a second step of calculating a positioning error of the receiver according to the position of each of the wireless transmitters and the position of the receiver and the standard deviation calculated in the first step; a third step of determining, according to the positioning error of the receiver calculated in the second step, wireless transmitters in directions nearer to a direction in which the positioning error is large; and a fourth step of re-detecting signals from the wireless transmitters in directions nearer to a direction in which the positioning error is large determined in the third step and thereby re-calculating the position of the receiver.

(2) The positioning method further includes a step of determining termination of the positioning operation by the fourth step according to a result of comparison between the positioning error of the receiver calculated in the second step and a predetermined value.

(3) In the positioning method, the fourth step includes calculating a position of the receiver according to each propagation delay time measured by re-detecting a signal from each of the wireless transmitters in directions nearer to a direction in which the positioning error is large determined in the third step, each standard deviation about measuring distance error associated with the measurement of the propagation delay time, the propagation delay time of each of the wireless terminals measured before the re-detection, the standard deviation calculated before the re-detection, and the position of each of the wireless transmitters and renewing the propagation delay time and the standard deviation about measuring distance error for each of the wireless transmitters in directions nearer to a direction in which the positioning error is large determined in the third step.

(4) A positioning method of calculating a position of a receiver according to propagation delay time of signals from a plurality of wireless transmitters includes a first step of detecting a signal from each wireless transmitter, obtaining a position of each wireless transmitter from which the signal is detected, measuring propagation delay time of the signal from the wireless transmitter, and calculating a position of the receiver and a standard deviation about measuring distance error associated with the measurement of the propagation delay time; a second step of calculating a positioning error of the receiver according to the position of each wireless transmitter and the position of the receiver and the standard deviation calculated in the first step; a third step of determining, according to the positioning error of the receiver calculated in the second step, wireless transmitters in directions nearer to a direction in which the positioning error is large; and a step of calculating a positioning error of the receiver at re-detection of a signal from each of the wireless transmitters in directions nearer to a direction in which the positioning error is large determined in the third step and thereby calculating a required number of re-detection to re-detect signals from each of the wireless transmitters in directions nearer to a direction in which the positioning error is large; and re-calculating the position of the receiver according to each propagation delay time measured by re-detecting a signal from each of the wireless transmitters as many times as indicated by the required number of re-detection, each standard deviation about measuring distance error associated with the measurement of the propagation delay time, the propagation delay time of each the wireless terminal measured before the re-detection, the standard deviation calculated before the re-detection, and the position of the wireless transmitter.

(5) In the positioning method of aspect (1) or (4), the an ellipse indicating a range of error is calculated according to the positioning error of the receiver.

(6) In the positioning method of aspect (1) or (4), the an ellipse indicating a range of error is calculated according to the positioning error of the receiver, and map information including the ellipse is selected from a map database.

(7) In the positioning method, a probability of inclusion of the position of said receiver in the ellipse indicating the range of error is calculated.

(8) A position information supplying system including a handset including a positioning unit for calculating a position according to propagation delay time of signals from a plurality of wireless transmitters, a server for supplying map information, and a position information recognizing unit for supplying the position calculated by the positioning unit, in a format recognizable by a user, wherein:

the handset, the server, and the position information recognizing unit are connected via a communication network to each other;

the positioning unit includes determining means for determining wireless transmitters in directions nearer to a direction in which the positioning error is large and positioning means for re-detecting signals from the wireless transmitters in directions nearer to a direction in which the positioning error is large and thereby re-calculating the position of the handset;

the server includes map information output means for selecting and outputting, according to the position of the handset calculated by the positioning unit, map information corresponding to the position; and the position information recognizing unit outputs the position of the positioning unit and the map information as information recognizable by a user.

(9) In the position information supplying system, the positioning unit outputs the position of the handset and the positioning error, the map information output means selects and outputs map information in a range in which the ellipse calculated according to the positioning error is included, and the position information recognizing unit conducts the output operation by displaying the position of the handset, the positioning error, and the map information.

(10) A software product to make a computer execute a positioning method of calculating a position of a receiver according to propagation delay time of signals from a plurality of wireless transmitters, the positioning method including:

a first step of detecting a signal from each of the wireless transmitters, obtaining a position of each of the wireless transmitters from which the signal is detected, measuring propagation delay time of the signal from each of the wireless transmitters, and calculating a position of the receiver and a standard deviation about measuring distance error associated with the measurement of the propagation delay time;

a second step of calculating a positioning error of the receiver according to the position of each of the wireless transmitters and the position of the receiver and the standard deviation calculated in the first step;

a third step of determining, according to the positioning error of the receiver calculated in the second step, wireless transmitters in directions nearer to a direction in which the positioning error is large; and a fourth step of re-detecting signals from the wireless transmitters in directions nearer to a direction in which the positioning error is large determined in the third step and thereby re-calculating the position of the receiver.

Another aspect of the present invention is as follows.

(11) A processing unit integrally including a program to make a computer serving as a positioning unit to calculate a position of a receiver according to propagation delay time of signals from a plurality of wireless transmitters, the program making a computer serving as:

positioning means for obtaining a position of the positioning unit according to the propagation delay time;

standard deviation calculating means for calculating a standard deviation about measuring distance error associated with the measurement of the propagation delay time;

error calculating means for calculating the positioning error of the positioning unit according to the position of each wireless transmitter, the position of the positioning unit calculated by the positioning means, and the standard deviation calculated by the standard deviation calculating means; and determining means for determining, according to the positioning error calculated by the error calculating means, wireless transmitters in directions nearer to a direction in which the positioning error is large, wherein the positioning unit re-calculates the position of the positioning unit according to signals re-detected from the wireless transmitters in directions nearer to a direction in which the positioning error is large.

Still other aspects of the present invention are as follows.

(12) A server for use with a position information supplying system including a handset including a positioning unit for determining, according to propagation delay time of signals from a plurality of wireless transmitters, wireless transmitters in directions nearer to a direction in which the positioning error is large, re-detecting signals from the wireless transmitters in directions nearer to a direction in which the positioning error is large, and thereby calculating a position and a position information recognizing unit for supplying information of the position detected by the handset to a user, the server being connected for communication to the handset and the position information recognizing unit, wherein:

the server includes a communication control unit to control communication with an external device and a control unit to read map information from a map database;

the control unit selects, according to the position of the handset calculated by the positioning unit, map information corresponding to the position; and the communication control unit outputs the map information to the position information recognizing unit.

(13) Additionally, it is also possible that the positioning unit selects and outputs, according to the positioning error calculated by the positioning unit together with the position of the handset, map information in a range in which an ellipse corresponding to the positioning error is included.

(14) Moreover, there is also included an authentication and billing unit to conduct authentication and billing operation according to identifier information of the handset, and the authentication and billing unit may generate billing data according to a state of utilization of the map information.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A positioning method of calculating a position of a receiver according to propagation delay time of signals from a plurality of wireless transmitters, comprising:

a first step of detecting a signal from each of the wireless transmitters, obtaining a position of each of the wireless transmitters from which the signal is detected, measuring propagation delay time of the signal from each of the wireless transmitters, and calculating a position of the receiver and a standard deviation about measuring distance error associated with the measurement of the propagation delay time;

a second step of calculating a positioning error of the receiver according to the position of each of the wireless transmitters and the position of the receiver and the standard deviation calculated in said first step;

a third step of determining, according to the positioning error of the receiver calculated in said second step, wireless transmitters in directions nearer to a direction in which the positioning error is large; and a fourth step of re-detecting signals from the wireless transmitters in directions nearer to a direction in which the positioning error is large determined in said third step and thereby re-calculating the position of the receiver.

2. A positioning method according to claim 1, further comprising a step of determining termination of the positioning operation by said fourth step according to a result of comparison between the positioning error of the receiver calculated in said second step and a predetermined value.

3. A positioning method according to claim 1, wherein said fourth step comprises calculating a position of the receiver according to each propagation delay time measured by re-detecting a signal from each of the wireless transmitters in directions nearer to a direction in which the positioning error is large determined in said third step, each standard deviation about measuring distance error associated with the measurement of the propagation delay time, the propagation delay time of each said wireless terminal measured before the re-detection, the standard deviation calculated before the re-detection, and the position of each said wireless transmitter and renewing the propagation delay time and the standard deviation about measuring distance error for each of the wireless transmitters in directions nearer to a direction in which the positioning error is large determined in said third step.

4. A positioning method of calculating a position of a receiver according to propagation delay time of signals from a plurality of wireless transmitters, comprising:

a first step of detecting a signal from each wireless transmitter, obtaining a position of each wireless transmitter from which the signal is detected, measuring propagation delay time of the signal from said each wireless transmitter, and calculating a position of the receiver and a standard deviation about measuring distance error associated with the measurement of the propagation delay time;

a second step of calculating a positioning error of the receiver according to the position of each wireless transmitter and the position of the receiver and the standard deviation calculated in said first step;

a third step of determining, according to the positioning error of the receiver calculated in said second step, wireless transmitters in directions nearer to a direction in which the positioning error is large; and a step of calculating a positioning error of the receiver at re-detection of a signal from each of the wireless transmitters in directions nearer to a direction in which the positioning error is large determined in said third step and thereby calculating a required number of re-detection to re-detect signals from each of the wireless transmitters in directions nearer to a direction in which the positioning error is large; and re-calculating the position of the receiver according to each propagation delay time measured by re-detecting a signal from each of the wireless transmitters as many times as indicated by the required number of re-detection, each standard deviation about measuring distance error associated with the measurement of the propagation delay time, the propagation delay time of each said wireless terminal measured before the re-detection, the standard deviation calculated before the re-detection, and the position of each said wireless transmitter.

5. A positioning method according to claim 4, wherein said third step determines order of the wireless transmitters in directions nearer to a direction in which the positioning error is large according to the positioning error calculated in said second step and a quotient obtained for each of the wireless transmitters in association with the standard deviation about measuring distance error in a direction cosine for the receiver.

6. A positioning system for calculating a position of a receiver according to propagation delay time of signals from a plurality of wireless transmitters, comprising:

a receiver unit for receiving a signal from each of said wireless transmitters;

a delay profile generator for generating a delay profile of a signal from said each wireless transmitter and for outputting the delay profile;

a propagation time measurement unit for analyzing the delay profile and for thereby measuring propagation delay time of the signal;

a storage unit for storing data required to calculate a position of the positioning system; and a processing unit for controlling said receiver unit, said delay profile generator, said propagation time measurement unit, and said storage unit for processing various data used to calculate the position and for thereby conducting a positioning operation, wherein said processing unit comprises:

position calculating means for obtaining a position of said positioning system according to the propagation delay time measured by said propagation time measurement unit;

standard deviation calculating means for calculating a standard deviation about measuring distance error associated with the measurement of the propagation delay time; and error calculating means for calculating a positioning error of said positioning system according to the position of each of said wireless transmitters, the position of said positioning system calculated by said position calculating means, and the standard deviation calculated by said standard deviation calculating means.

7. A positioning system according to claim 6, further comprising determining means for determining wireless transmitters in directions nearer to a direction in which the positioning error is large according to the positioning error calculated by said error calculating means, wherein:

said position calculating means re-calculates the position of said positioning system according to signals from said re-detected wireless transmitters in directions nearer to a direction in which the positioning error is large; and said error calculating means re-calculates the positioning error of said positioning system using the re-calculated position of said positioning system.

8. A positioning system according to claim 6, further comprising a display unit for displaying thereon the position of said positioning system calculated by said positioning means and the positioning error calculated by said error calculating means, wherein:

said processing unit calculates an ellipse indicating a range of error according to the positioning error of said positioning system; and said display unit displays the position of said positioning system and the positioning error by the ellipse.

9. A positioning system according to claim 8, wherein said display unit displays the position of said positioning system, the positioning error, and map information supplied from a map database.

10. A positioning system according to claim 8, wherein said display unit displays a probability of inclusion of the position of said receiver in the ellipse indicating the range of error.

11. A position information supplying method for use with a position information supplying system comprising a handset including a positioning unit for calculating a position according to propagation delay time of signals from a plurality of wireless transmitters and a position information recognizing unit for supplying the position calculated by the positioning unit, in a format recognizable by a user, wherein:

the positioning unit determines wireless transmitters in directions nearer to a direction in which the positioning error is large, re-detecting signals from the wireless transmitters in directions nearer to a direction in which the positioning error is large, re-calculating the position of the handset, and outputting information of the position to a communication network; and the position information recognizing unit receives a result of the positioning operation received from the positioning unit via the communication network, generating information recognizable by a user by combining the result of the positioning operation with map information corresponding thereto, and outputting the information.

12. A position information supplying method according to claim 11, wherein:

the positioning unit outputs, as a result of the positioning operation, the position of the handset and the positioning error of the handset; and the position information recognizing unit outputs, as information recognizable by a user, map information supplied from a map database together with the position and the positioning error of the handset as a result of a positioning operation by the handset.

13. A position information supplying method according to claim 12, wherein the positioning error of the handset is outputted by displaying an ellipse indicating a range of error.

* * * * *